Oct. 8, 1957   JEAN-JACQUES GOUFFON   2,808,756
MOTION-PICTURE CAMERA FADING MECHANISM
Filed July 19, 1951   6 Sheets-Sheet 1

INVENTOR
Jean-Jacques Gouffon.

BY
ATTORNEY

INVENTOR
Jean-Jacques Gouffon.

BY

ATTORNEY

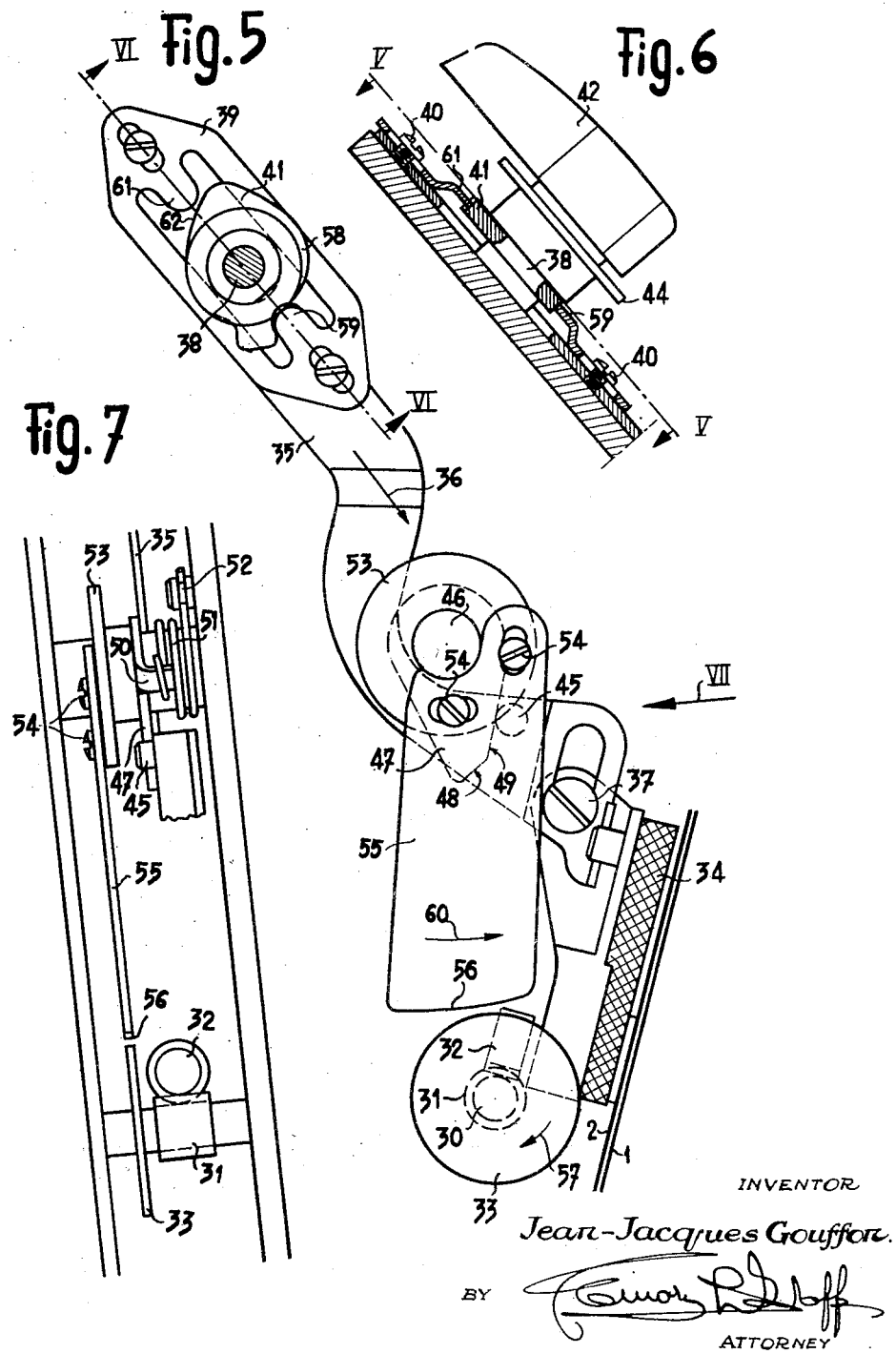

INVENTOR
Jean-Jacques Gouffon.

BY

ATTORNEY

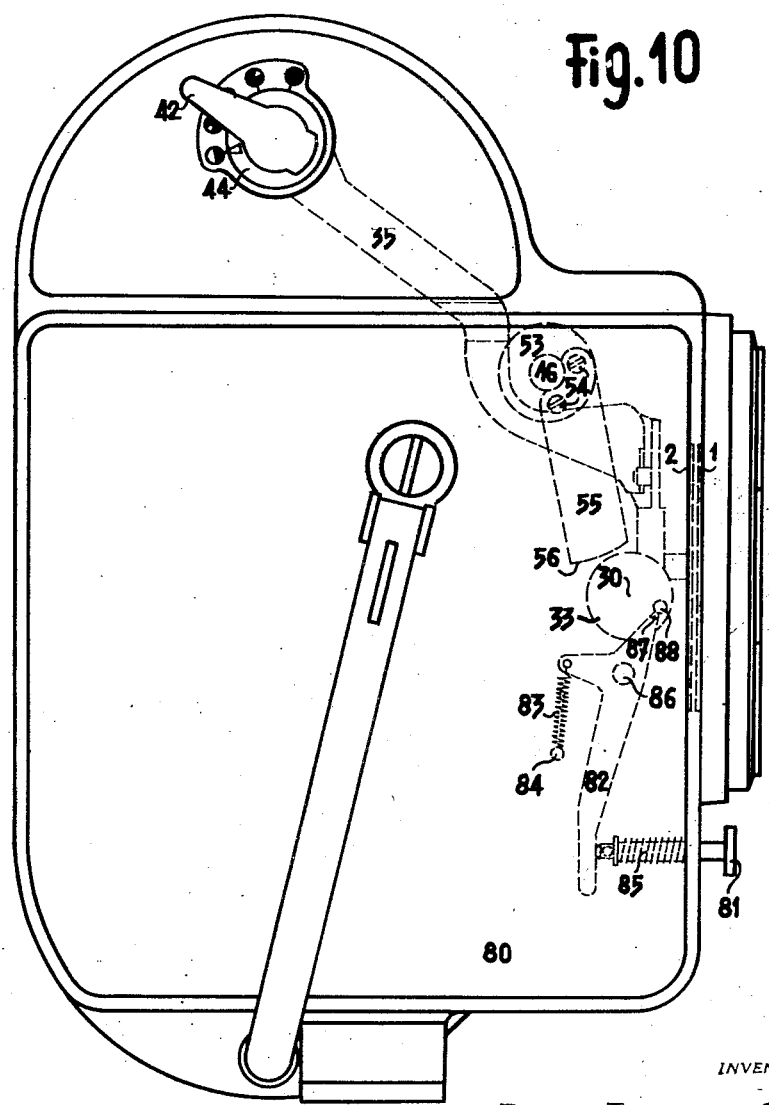

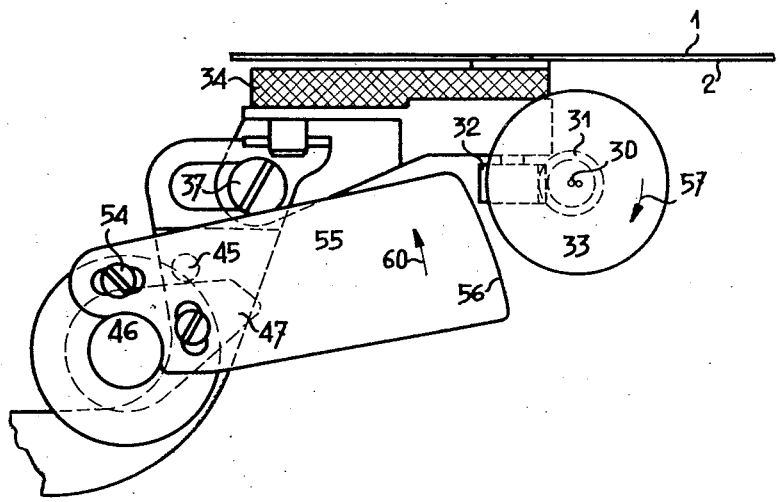
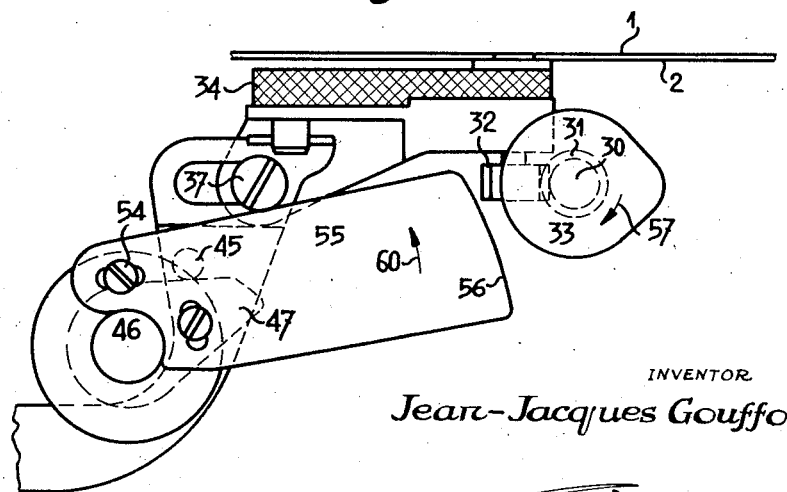

United States Patent Office 2,808,756
Patented Oct. 8, 1957

2,808,756

MOTION-PICTURE CAMERA FADING MECHANISM

Jean-Jacques Gouffon, Yverdon, Switzerland, assignor to Paillard S. A., Sainte-Croix, Switzerland, a corporation of Switzerland Application July 19, 1951, Serial No. 237,569

Claims priority, application Switzerland September 16, 1950

3 Claims. (Cl. 88—19.3)

The present invention relates to a motion-picture camera of the type including a variable shutter synchronized with the film-driving mechanism which is locked and released by a control lever.

Variable shutter motion-picture cameras now in general use have certain disadvantages, some of which are: (1) when the shutter is completely closed, the film-driving mechanism continues to turn because the locking of said film-driving mechanism is independent of the control of the variable shutter. When the operator executes a fade-out, he does not know exactly when to stop filming, since he does not know when the shutter is closed. In the case of a fade-in, he must first put the mechanism into operation before he can attend to the variable shutter. This procedure is awkward and, moreover, a number of images will not be exposed with a resulting loss of film. Another disadvantage resides in the fact that, if the operator does not check the position of the variable shutter before each take, exposures may be made involuntarily with the shutter closed; (2) the apparatus stops automatically when the shutter is closed, but must again be put into operation by the releasing lever. As in the preceding case, this procedure is awkward, and several images are lost in a fade-in.

Other forms of apparatus provided with a variable shutter are equipped with a device for indicating the position of the shutter in the viewfinder. This solution has the disadvantage of distracting the operator while taking pictures, since his attention is held by the shutter indication at the expense of the scene being filmed. Moreover, this procedure lacks precision inasmuch as the position of the image in the viewfinder corresponds but rarely with the actual position of the shutter. Finally, this solution does not eliminate the operator's reflex factor, a factor which alone determines the actual movement of the locking of the film-driving mechanism.

The object of the present invention is to provide apparatus remedying the aforementioned disadvantages, the said new apparatus characterized by the fact that its variable shutter is adapted to be adjusted by a control member which stops the film-driving mechanism as soon as the shutter is closed, and puts it into operation as soon as the shutter begins to open, independently of the releasing lever.

The accompanying drawing shows, by way of example, three embodiments of the object of the invention.

Figure 5 is a plan view of the third embodiment;

Figure 6 is a section on line VI—VI in Figure 5;

Figure 7 is a side view in the direction of arrow VII in Figure 5;

Figure 10 is a side elevation of a camera on which is mounted the mechanism shown in Figures 5 to 7.

Figures 11 and 12 are partial plan views of modified forms of the third embodiment.

Similar reference characters designate corresponding parts throughout the several figures of the drawing.

Figure 1:
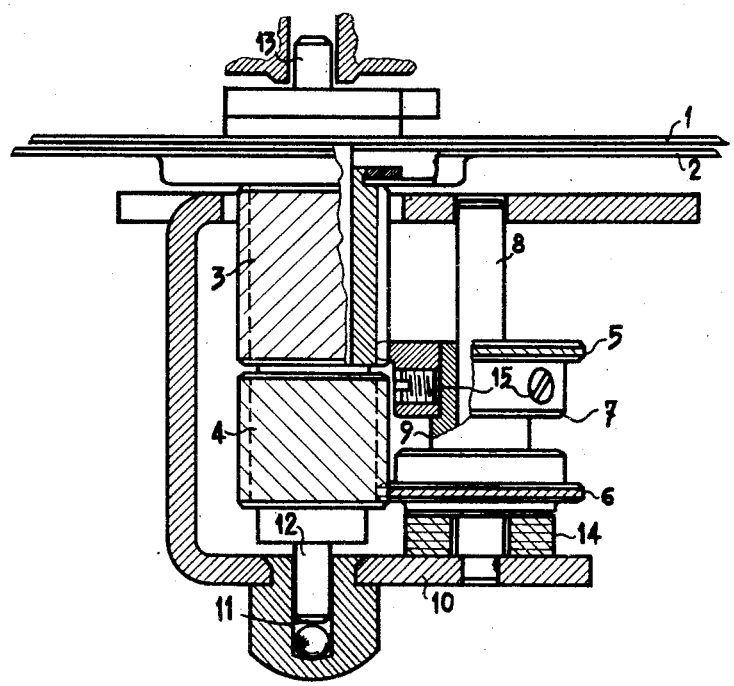
Figure 1 is a section through a control mechanism for a variable shutter according to a first embodiment.

In the first embodiment shown in the drawing, the camera is provided with a variable shutter having two blades 1 and 2 rotating in the same direction. Adjustment of this shutter is effected by varying the relative angular position of blades 1 and 2. To that end, the shutter-control mechanism comprises two coaxial pinions 3 and 4 with helicoidal teeth, the teeth of one pinion being inverted relative to the other. Each of the pinions 3 and 4 is rigidly connected to one of the blades 1 and 2 of the shutter and meshes with a related wheel 5 or 6, respectively, with corresponding teeth. Wheels 5 and 6 are part of a sliding member 7 adapted to be moved or shifted along a shaft 8, parallel to the axis of pinions 3 and 4, by a control member 71 on shaft 72 and having a pin or finger 73 (Figures 8 and 9) which enters and engages groove 9 of sliding member 7. Shaft 8, supporting sliding member 7, is rigidly fastened to a support 10 which pivotally journals at 11, one end of spindle 12 carrying said pinions 3 and 4. The other end of spindle 12 is journalled at 13, in another fixed part of the apparatus. The pinion 4, which drives blade 1, is rigidly secured to spindle 12 to rotate therewith, whereas pinion 3, which drives blade 2, is loosely mounted on spindle 12. Thus, through the displacement of sliding clutch member 7 along shaft 8, wheels 5 and 6, which are rigidly fastened to sliding member 7, cause an angular displacement of pinions 3 and 4 relative to each other and also a relative angular displacement of blades 1 and 2.

Braking means cooperating with clutch member 7 are provided for locking pinions 3 and 4 when said member 7 reaches the end of its travel after having been displaced in a given direction, thereby causing the closing of the shutter; in other words, blades 1 and 2 are placed in such a position that they form an uninterrupted disc. In the embodiment shown in Figure 1, said means comprises a piece of material with a high friction coefficient, such as a washer of cork 14 around shaft 8 and through the intermediary of which the sliding member 7 comes to bear against support 10. In mounting the mechanism shown in Figure 1, the shutter is adjusted in the closed position by loosening screws 15 intended to lock wheel 5 in relation to the sliding member, by pushing sliding member 7 against washer 14, and by causing toothed wheel 5 to turn by a required angle in relation to sliding member 7. Once set, the shutter blades will always be in light obstructing relation to the film, when the slide 7 is locked to 14.

The operation of the mechanism described above is as follows:

The pin 73 of the control lever which engages groove 9 may be actuated either mechanically or by hand to displace sliding member 7 between the two supporting walls 10. The moment the shutter is closed, the sliding member comes to rest on cork washer 14, causing additional friction in the mechanism with the result that the latter is locked, as is also the film-driving mechanism. When the shuter is to be opened, the sliding member 7 moves away from washer 14 and the mechanism starts operating at once. This movement also simultaneously unlocks the film-driving mechanism.

In the embodiment above described, the film-driving mechanism stops in any position when the shutter is locked. In certain cases it may be desirable to stop the axis of the claw and the axis of the shutter always in the same given position. For instance, to effect the rewind of the film by acting on the feeding reel, the claw must be disengaged from the film.

Figure 2:
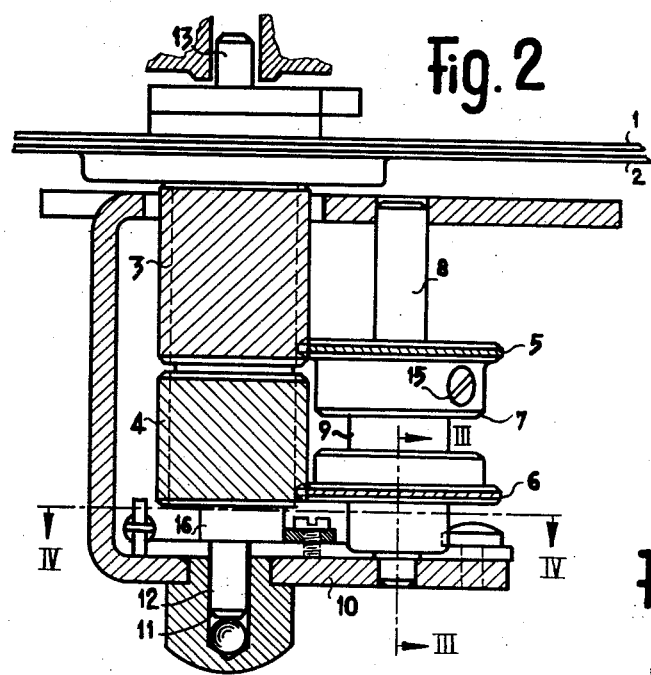
Figure 2 is a section similar to that shown in Figure 1, of a modified form of the invention.
Figure 3:
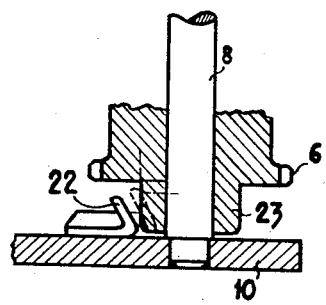
Figure 3 is a section taken on line III—III in Figure 2.
Figure 4:
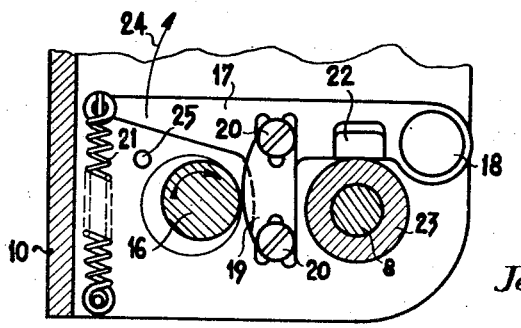
Figure 4 is a section taken on line IV—IV in Figure 2.

In the modification illustrated in Figures 2 to 4, the camera comprises a mechanism for driving the variable shutter of the same type as the one shown in Figure 1. The shutter locking means are different, however, and permit the stopping of the film-driving mechanism in a given position. These locking means comprise an eccentric 16 rigidly secured to pinion 4 and locking means adapted to cooperate with the said eccentric 16 for the purpose of holding pinions 3 and 4. In the embodiment shown in Figures 2 to 4, the said locking means consists in a lever 17 pivoted at 18 on support 10. The portion of lever 17 intended to cooperate with the eccentric 16 is formed by a brake shoe in the form of plate 19 detachably mounted by screws 20 on an extension of lever 17. A spring 21, one end of which is fastened to support 10, the other to the free end of lever 17, serves to maintain the latter in the inactive position. An inclined lug 22 is provided on lever 17 for cooperating with a hub extension 23 of sliding member 7 (see Figures 3 and 4).

The operation of the device above described is similar to that of the arrangement shown in Figure 1. However, to lock the mechanism, when sliding member 7, driven by a pin of the control member (not shown) approaches lever 17, hub 23 of said member 7, by engaging with inclined lug 22, causes lever 17 to be displaced away from stop pin 25 in the direction of arrow 24 (Figure 4) with the result that the curved edge of the brake shoe plate 19 moves up and toward the surface or edge of eccentric 16. Pinion 5 of sliding member 7 is adjusted in such a way that, the moment lever 17 has undergone its maximum displacement, the shutter is completely closed. In this position of lever 17 (position shown in Figure 4), plate 19 is adjusted in such a way that its edge extends slightly into the trajectory of eccentric 16. When the eccentric 16 is disposed opposite the zenith of the curved edge of plate 19, the same becomes jammed with the result that pinion 4 is stopped and, consequently, the film-driving mechanism is also stopped. The whole assembly is preferably adjusted in such a way that the mechanism is locked while the film-driving claw is disengaged. To put the mechanism into operation, it will only be necessary to displace sliding member 7 by the pin of the control lever so as to disengage inclined face of lug 22 of lever 17, the latter being then pulled back by tension spring 21 against a pin 25 on support 10. In this movement, plate 19 moves in an arc down and away from eccentric 16 and enables the latter to resume its travel.

Figure 9:
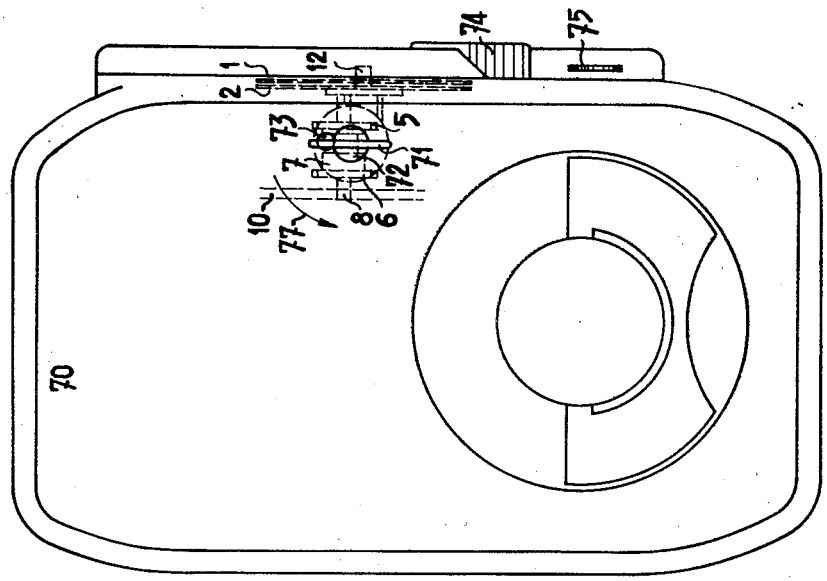
Figure 9 is a side elevation of the camera shown in Figure 8.
Figure 8:
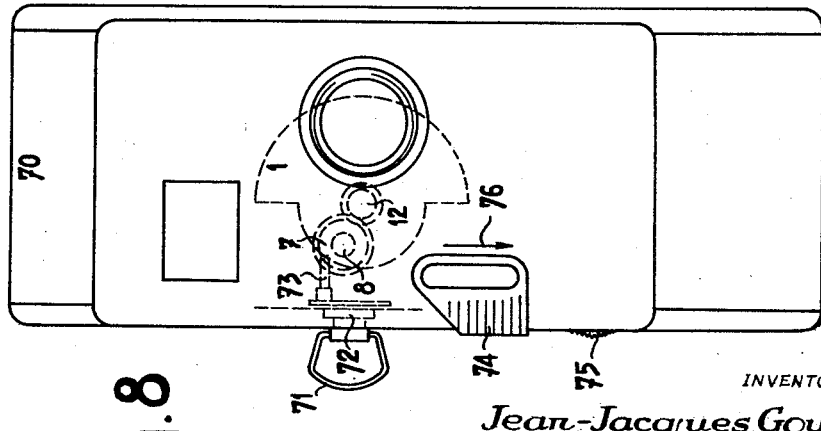
Figure 8 is a front elevation of a camera on which is mounted one of the mechanisms shown in Figures 1 and 2.

One or the other of the mechanisms shown in Figures 1 or 2, is shown embodied in a motion-picture camera in Figures 8 and 9. The said mechanism will be seen mounted in camera 70. This camera shows on one of its sides the control member 71 secured to axis 72 provided with an eccentric finger 73 which engages groove 9 of sliding member 7. On the other hand, the camera is provided with a releasing member 74 and a locking member 75.

The operation of these different members is as follows:

The operator puts the mechanism into motion by depressing member 74 in the direction of arrow 76. He can maintain member 74 in that position either with a finger or else lock it in that operating position by displacing member 75. He will then terminate the picture taking with a fade-out by turning member 71 in the direction of arrow 77 (Figure 9). By turning member 71 in the opposite direction, the operator can begin the shooting with a fade-in. After a fade-out, one may release or unlock member 74 by displacing member 75, open the shutter by actuating control member 71 and begin a new exposure without fade-in. Similarly, one can terminate an exposure without fade-out and begin the next shooting with a fade-in after previously manipulating members 71, 74 and 75.

Figures 5 to 7 of the drawing show the application of the invention to motion-picture camera with variable shutter of known construction, whereby it is possible to stop the film-driving mechanism at the end of the closing of the shutter and to put it into operation as soon as the shutter begins to open, independent of the releasing lever of the apparatus. In this modification, the shutter comprising blades 1 and 2 is actuated by shaft 30 through pinions 31 and 32. Shaft 30 supports a disc 33 with which the locking members of the film-driving mechanism cooperate. Blade 1 is fixed in relation to pinion 32, whereas blade 2 is movable relative to blade 1. On the other hand, the two blades are mutually connected by a mechanism 34 which transmits the motion of one blade to the other blade with a transmission ratio of 1:1. By acting on mechanism 34 (of known construction) with lever 35, one causes a relative movement of blade 2 in relation to blade 1, regardless of whether the blades are in rotation or stopped. The position of lever 35 shown in the drawing corresponds to the complete opening of the shutter, whereas arrow 36 indicates the direction of the motion to be imparted to lever 35 in order to close the shutter. The slotted end of lever 35, sliding on stud 37 and spindle 38, is actuated through the intermediary of a bracket plate 39, adjustably fixed thereon by screws 40, and by cam 41, rigidly secured to the operating knob or handle 42 and rotating on axis 38. Handle 42 carries a disc 44 provided with a reference mark which moves in front of a scale or chart (Figure 10) indicating the opening of the shutter.

Lever 35 carries a pin 45 which controls the locking device associated with spindle 46. This locking device comprises an arm 47 forming a lever with two cam faces 48 and 49 which bear against pin 45, and a hook 50 (Figure 7) having attached thereto one end of a return spring 51, whose other end is hooked onto a pin 52. Lever 47 is rigidly secured to the flange of a hub 53 on on which screws 54 fasten the brake shoe 55 whose curved edge 56, can be brought into contact with the periphery of disc 33, thus bringing about the stopping of the film-driving mechanism through frictional engagement between disc 33 and brake shoe 55.

The operation of this mechanism is as follows:

Assuming that the film-driving mechanism is in motion, shaft 30 rotates in the direction indicated by arrow 57. The control members of mechanism 34 and of the locking device are in the position shown in the drawing. The operator, wishing to make a fade-out, turns handle 42 in such a way that the portion 58 of cam 41 pushes nose 59 of plate 39, thus moving lever 35 which then acts on mechanism 34. Mechanism 34 causes the position of blade 2 to vary in relation to blade 1, increasing the angle of obturation more and more. Pin 45, on lever 35, slides along cam face 49 of lever arm 47 which is caused to bear against the said pin by means of spring 51. Inasmuch as cam face 49 faces in the direction of movement of pin 45, lever 47 does not move as long as the pin slides along that face. The moment the angle of obturation of the blades reaches 360°, pin 45 passes from cam face 49 to cam face 48 which is angularly related to the direction of face 49. Pushed by spring 51, lever 47 turns in the direction indicated by arrow 60 and drives brake shoe 55 whose face 56 comes to bear against the periphery of disc 33. As a result, disc 33 is stopped as soon as contact is established between these two parts. The same holds true for the film-driving mechanism owing to the wedge effect of brake 55.

The fade-in is produced by the operator turning handle 42 in the direction which causes nose 61 of plate 39 to be pushed by part 62 of cam 41 and pin 45 on lever 35 begins to push back cam lever or arm 47. Brake shoe 55 then moves away from disc 33 which resumes rotation. The moment pin 45 passes from face 48 to face 49 of lever 47, the blades begin to open.

After the film-driving mechanism has been stopped through the closing of the shutter as described above, it is possible to make it turn backward without opening the blades. Disc 33 then rotates in the direction opposite to that shown by arrow 57, repels brake shoe 55 by simple friction against the action of spring 51. Since face 56 and the periphery of disc 33 do not separate, brake shoe 55 locks disc 33 again as soon as this backward rotation ceases and the forward rotation tends to resume.

To enable all these different parts to operate in a well synchronized manner, provision is made for three adjustments: by loosening screws 54, brake shoe 55 can be put into a correct position relative to lever 47. Face 56 is long enough so that any variation in the distance between spindles 30 and 46 can be made up for by a more or less pronounced inclination of brake shoe 55 in relation to lever 47. By loosening screws 40, lever 35 can be displaced relative to plate 39 to permit pin 45 to operate in a correct position in relation to cam edges 48 and 49 of lever 47. Moreover, means are provided in mechanism 34 to make it possible to adjust the position of blade 2 in relation to blade 1.

As a modification of the last-described form of execution, disc 33, instead of being mounted concentrically on driving shaft 30 as shown in Figure 5, could be fastened eccentrically on shaft 30 (see Figure 11). Further the disc 33 instead of being of circular form could have a cam shape. For example the periphery of the disc could have a boss projecting radially as shown in Figure 12. Thus, the locking of the film-driving mechanism would always be effected in the same given position the moment the most eccentric part of disc 33 abuts against brake shoe 55.

As in the embodiment shown in Figures 2 to 4, by arranging disc 33 of this modified construction in a given position on shaft 30, it would also be possible to lock the film-driving mechanism while the driving claw is disengaged from the film.

Figure 10 represents a motion-picture camera provided with the mechanism shown in Figure 5. That mechanism will be seen mounted in camera 80. The latter is provided with a releasing knob 81 cooperating with a releasing lever 82. This lever is acted upon by a spring 83 fastened to a fixed pin 84 and causing lever 82 to bear constantly against a fixed stop. A spring 85 maintains the shank of knob 81 against lever 82. This lever pivots about an axis 86 and is provided with a nose 87 designed to cooperate with a pin 88 secured to plate 33.

The manipulation of these control members is as follows:

The mechanism of the camera is put into operation by pressing with the finger on knob 81. Lever 82 then turns clockwise against the action of spring 83 with the result that nose 87 is withdrawn from the trajectory of pin 88. Thus, at the end of an exposure, the operator, by actuating handle 42, can produce a fade-out, at the end of which the mechanism is stopped. The apparatus may be provided with a locking arrangement making it possible to lock knob 81 in the pressed-in position and so as to permit execution of any desired succession of fade-outs or fade-ins as well as starts or stops by suitable manipulation of knob 81, of its locking arrangement, and of handle 42.

The combined manipulation of the various arrangements described herein for the control of the variable shutter, and of the lever for the release and the ordinary locking of the film-driving mechanism permits all desired cases of fades, such as: start with fade-in after stopping without fade; start without fade after a stop with fade-out; start with fade-in after a stop with fade-out; start without fade after a stop without fade; start with fade-in superimposed upon a fade-out.

I claim:

1. In a motion-picture apparatus, the combination, comprising, a frame, a film-driving mechanism, a variable shutter operatively connected to said film-driving mechanism, said mechanism and said shutter being mounted on said frame, whereby said shutter will be driven by said film-driving mechanism, said shutter comprising two blades rotatably mounted on the same axis, the relative angular positions of said blades being adjustable, an adjusting mechanism for said shutter comprising two coaxial pinions each having helicoidal teeth, the teeth of one pinion being inverted relative to the teeth of the other pinion, each of said pinions being rigidly secured to one of said blades, a slidable clutch member having wheels each meshing with one of said pinions, said adjusting mechanism also including control member means for displacing said clutch member along an axis parallel to the axis of the pinions, whereby the relative angular positions of the pinions are caused to vary, and brake means for stopping the rotation of the shutter and the movement of the film, whereby the helicoidal pinions are locked when the slidable member reaches the end of its travel in a given direction to bring about the closing of the shutter.

2. A motion-picture apparatus according to claim 1, wherein the two toothed wheels of the sliding member are secured for angular adjustment relative to each other.

3. A motion-picture apparatus according to claim 1, wherein the brake means for locking the pinions comprises a member having a high friction coefficient through the medium of which the slidable member is adapted to come to rest at the end of its travel in the direction producing the closing of the shutter.

References Cited in the file of this patent

UNITED STATES PATENTS

| 1,417,005 | Wescott | May 23, 1922 |
| 1,912,749 | Wittel | June 6, 1933 |
| 2,117,694 | Becker | May 17, 1938 |
| 2,319,204 | Bolsey | May 18, 1943 |
| 2,376,300 | Widmer | May 15, 1945 |
| 2,376,301 | Widmer | May 15, 1945 |
| 2,515,330 | Bolsey | July 18, 1950 |

FOREIGN PATENTS

| 453,820 | Great Britain | Sept. 18, 1936 |
| 228,957 | Switzerland | Jan. 3, 1944 |
| 240,471 | Switzerland | Apr. 16, 1946 |